US008407281B2

(12) United States Patent
Howard

(10) Patent No.: US 8,407,281 B2
(45) Date of Patent: Mar. 26, 2013

(54) INTENTION-BASED AUTOMATED CONFLICT PREDICTION AND NOTIFICATION SYSTEM

(76) Inventor: Newton Howard, Lorton, VA (US)

( * ) Notice: Subject to any disclaimer, the term of this patent is extended or adjusted under 35 U.S.C. 154(b) by 1175 days.

(21) Appl. No.: 09/912,918

(22) Filed: Jul. 25, 2001

(65) Prior Publication Data

US 2002/0032733 A1    Mar. 14, 2002

Related U.S. Application Data

(60) Provisional application No. 60/221,231, filed on Jul. 25, 2000.

(51) Int. Cl.
*G06F 15/16* (2006.01)
(52) U.S. Cl. .......................... 709/203; 709/202
(58) Field of Classification Search .................... 709/203
See application file for complete search history.

(56) References Cited

U.S. PATENT DOCUMENTS

| | | | | |
|---|---|---|---|---|
| 6,114,990 | A * | 9/2000 | Bergljung et al. | 342/357.09 |
| 6,209,873 | B1 * | 4/2001 | DeGeorge | 273/262 |
| 6,408,404 | B1 * | 6/2002 | Ladwig | 714/39 |
| 6,420,993 | B1 * | 7/2002 | Varon | 342/36 |

OTHER PUBLICATIONS

Ted Agres. "VR for war games—and for real." Resarch & Development. Highlands Ranch: Feb. 1997. vol. 39, Iss. 2; p. 45 (3 pages).*

* cited by examiner

*Primary Examiner* — Ojo O Oyebisi
(74) *Attorney, Agent, or Firm* — Smith, Gambrell & Russell, LLP

(57) ABSTRACT

Input devices such as satellites, field sensors, electronic pads, cellular phones, and/or radio transmitters communicate information representing queries, reports, and/or instructions to an intention determination system that is accessible by a user interface with a display. The intention determination system includes an input module for processing the information received from the input devices; a language converter for converting the information from a natural language format to a restructured form in a position-based format; a database system for storing the received information, the restructured information, and reference information; and a rule-based analyzer for periodically retrieving and processing the stored information. The analyzer sends an alert to the user interface to notify the user if execution of one the instructions creates a potential conflict with the other stored information. The user interface can include a node-based navigation system that allows user customization of how the alert is displayed.

25 Claims, 11 Drawing Sheets

INTENTION-BASED AUTOMATED CONFLICT PREDICTION AND NOTIFICATION SYSTEM

CROSS REFERENCE TO RELATED APPLICATIONS

This patent application claims priority to commonly-owned U.S. Provisional Patent Application Ser. No. 60/221,231 entitled "System and Method for Command, Control, and Communication for Personnel and Weaponry" filed on Jul. 25, 2000, which is hereby incorporated by reference in its entirety.

TECHNICAL FIELD

The present invention relates generally to the field of automated systems, and more particularly to an automated system for predicting conflicts among issued instructions based on the issuer's intent, and notifying the appropriate users of the potential conflicts.

BACKGROUND OF THE INVENTION

Amidst a technologically advanced society, the quest for increasing automation with effective integration continues. From coffee makers with an automatic start to military control centers with automatic notification of enemy vessels, automation often necessitates the inclusion of some problem recognition features. For example, some coffee makers include an automatic shut off that recognizes leaving the coffee maker on too long can also create a problem. Without problem recognition, automated systems could continue in a regular operation mode, which often exacerbates the problem. Consequently, there has been development in the area problem recognition.

Numerous systems include a rule-based problem recognition system designed to issue some sort of notification when a problem is recognized. When systems receive information from several sources, these systems may recognize that a problem exists as received information conflicts with one of the preset rules. Rule based conflict recognition has been used in many areas including military tactics. Militaries employ countless technologies to gather and disseminate battlefield information. Generally, the goal is eliminating uncertainty and conflict recognition using awareness of circumstances, or situational awareness.

Situational Awareness refers to an explicit knowledge of the current state of the physical world while Intention Awareness connotes a more implicit knowledge of the mental world. Situational Awareness involves the present moments while Intention Awareness indicates the most probable future states by focusing on the motivations of the actors involved. Intention Awareness informs and enhances Situational Awareness, providing a more comprehensive understanding of an existing situation. Consequently, conflict recognition systems that consider only Situational Awareness are devoid of information that could critically impact the future.

To date, Situational Awareness has advanced primarily by providing a soldier with a near real-time view of current battlefield conditions. Some current systems focus on advancing and sharing Situational Awareness by enabling the soldier to receive, compare, and communicate battle state information faster and more accurately. Through the use of embedded computing and communications systems, these Situational Awareness systems enable the coordination of units and weapon systems to participate in a battle with better reliability, lethality, survivability, and tempo of attack.

While Situational Awareness does aid in conflict recognition, knowledge of physical circumstances rarely provides a complete view of a situation. Possessing Situation Awareness alone can considerably impact the most common tasks, such as navigating a busy parking lot. With a brief glance around, a driver becomes immediately aware of the locations of the other cars and people moving around the lot. Knowledge of these objects and their relative positions provide Situational Awareness. Because the situation may change, the driver should be aware of the intentions of the other drivers and pedestrians. For example, a pedestrian can walk behind the driver's car. If the driver remains unaware of the pedestrian's intention, the driver could seriously injure the pedestrian.

Consequently, conflict recognition systems that utilize only Situational Awareness can remain susceptible to potentially dangerous situations. For example, military tactics that use Situational Awareness currently provide a great deal of assistance both in coordinating the flow of orders and information and also in visualizing the current state of battle. However, fratricide studies show that even powerful tools like these still prove insufficient when forced to operate in such a chaotic, interdependent, and fast-paced environment as the $21^{st}$ century battlefield.

Fratricide as used herein means unintentionally firing upon and killing friendly, or non-enemy, troops. Hence, each case of fratricide is a mistake, most often resulting from misidentification, miscommunication, or other factors, which have contributed to a shooter's confusion. However, these mistakes often result in the loss of lives. Some current systems employ Situational Awareness to reduce uncertainty and confusion. Yet, there has been only a minimal reduction in the frequency of fratricide using these systems. As described above, Situational Awareness alone does not provide a complete picture of a given situation.

Accordingly, despite the development in the area of notification systems, conventional solutions still fail to provide a complete view of a given situation. Thus a need still exists for an automated support system that reduces operational uncertainty, notifies users of potential problems, and considers both the physical circumstances as well as the users' intentions when predicting the potential problems.

SUMMARY OF THE INVENTION

The present invention meets the needs described above by providing an automated conflict prediction and notification system utilizing Intention Awareness that can be used in a host of areas such as management, medical treatment, and military tactics. When used in military tactics, the invention provides predictive error checking, increased Intention Awareness, and enhanced communication.

The invention provides predictive error-checking and conflict resolution by comparing orders and field reports against one another and against existing military databases (for terrain, weather, equipment, artillery, logistics, military doctrine, etc) to determine their validity and tactical effectiveness. Possible conflicts such as advancing units into a line of fire, NBC hazard, airstrike zone, or minefield, or beyond the reach of logistical support, are detected through expert systems analysis and are flagged before they are issued.

In addition to conflict assessment, the invented systems further advance Intention Awareness by enabling commanders to view the orders issued by their subordinates to ensure they conform to their intent. The system further enables commanders to graphically visualize and communicate their intent using multi-level overlays, digital pen capabilities, and so forth, and through the use of graphical spatial-temporal relationship lines between units and areas.

Furthermore, the system provides the use of inexpensive, slightly customized commercial broadband wireless LAN technology to provide a far more powerful and effective Tactical Internet that will have orders of magnitude more throughputs, a far greater range, no line of sight limitations, no infrastructure requirements, and no centralized NOC vulnerabilities. Furthermore, this wireless network architecture will be completely undetectable and unassailable by enemy forces.

Generally described, the present invention includes an automated system for notifying a first user who issued a first instruction and a second user who issued a second instruction of a potential conflict. For example, the instructions can be orders issued by military personnel. The system includes input devices for receiving the first instruction entered by the first user; a passive input device for receiving the second instruction entered by the second user; an intention determination system for analyzing the instructions, determining if execution of the instructions complies with the users' intent, and issuing an alert if execution of the instructions creates the potential conflict; and first and second user interfaces for respectively notifying the first and second user by displaying the alert. The input devices can include cellular phones, radio transmitters, electronic pads, field sensors, and/or satellites.

In one aspect of the invention, the intention determination system includes an input module for receiving and processing the instructions; a language converter for converting the instructions from a natural language format to a position-based format, wherein the conversion generates restructured instructions; a database for storing both the instructions, the restructured instructions, and reference information; and a rulebased analyzer for periodically retrieving and processing at least some of the instructions, restructured instructions, and reference information to determine if execution of the instructions creates the potential conflict.

In another aspect of the invention, the user interface includes a display panel; a preferences panel for selecting display preferences for objects that appear in the display panel; and a node-based navigation system including four navigational nodes representing preferences, areas of operation, units, and fragmentary orders. In operation, the selection of one of the nodes repositions that node in the center.

In view of the foregoing, it will be appreciated that the automated system of the present invention avoids the drawbacks of prior systems. The specific techniques and structures employed by the invention to improve over the drawbacks of the prior systems and accomplish the advantages described above will become apparent from the following detailed description of the embodiments of the invention and the appended drawings and claims.

DETAILED DESCRIPTION OF THE EMBODIMENTS

The present invention may be embodied in an intention-based automated conflict prediction and notification system for nondeterministic identification and resolution of conflicts. In computing, nondeterministic applications generally refers to systems whose emergent property is that they depend upon the contextual interaction between users and data. Because conflict identification and resolution of nondeterministic situations applies to many areas, the invented system is applicable in management, medical treatments, and other fields, as well as military operations.

Warfare itself is a chaotic, indeterminate system with thousands of vehicles, processes, areas, soldiers, missions, and actions operating in concert. Yet these interactions and operations never happen in exactly the same way twice. Each operation uses different numbers and types of deployments, each with completely different sets of objectives and variables, yet the invented conflict notification system not only tracks but coordinate all these activities. To be effective, computer systems should model the realworld systems they attempt to serve as closely as possible. For this reason, the invented client notification system has been designed with inherent flexibility so that it can dynamically model situations of indeterminacy. Consequently, the architecture makes the system sufficiently flexible and uniquely capable to both track and coordinate the operations of such a dynamic and nondeterministic (variable) situation such as military operations. When completed and fully integrated, this system is an effective decisionsupport and conflict resolution tool that easily integrates with current procedures. The system will be most effective in making rapid decisions in situations where overlooking key pieces of information and interdependencies can result in issuing conflicting and/or hazardous orders.

Figure 1:
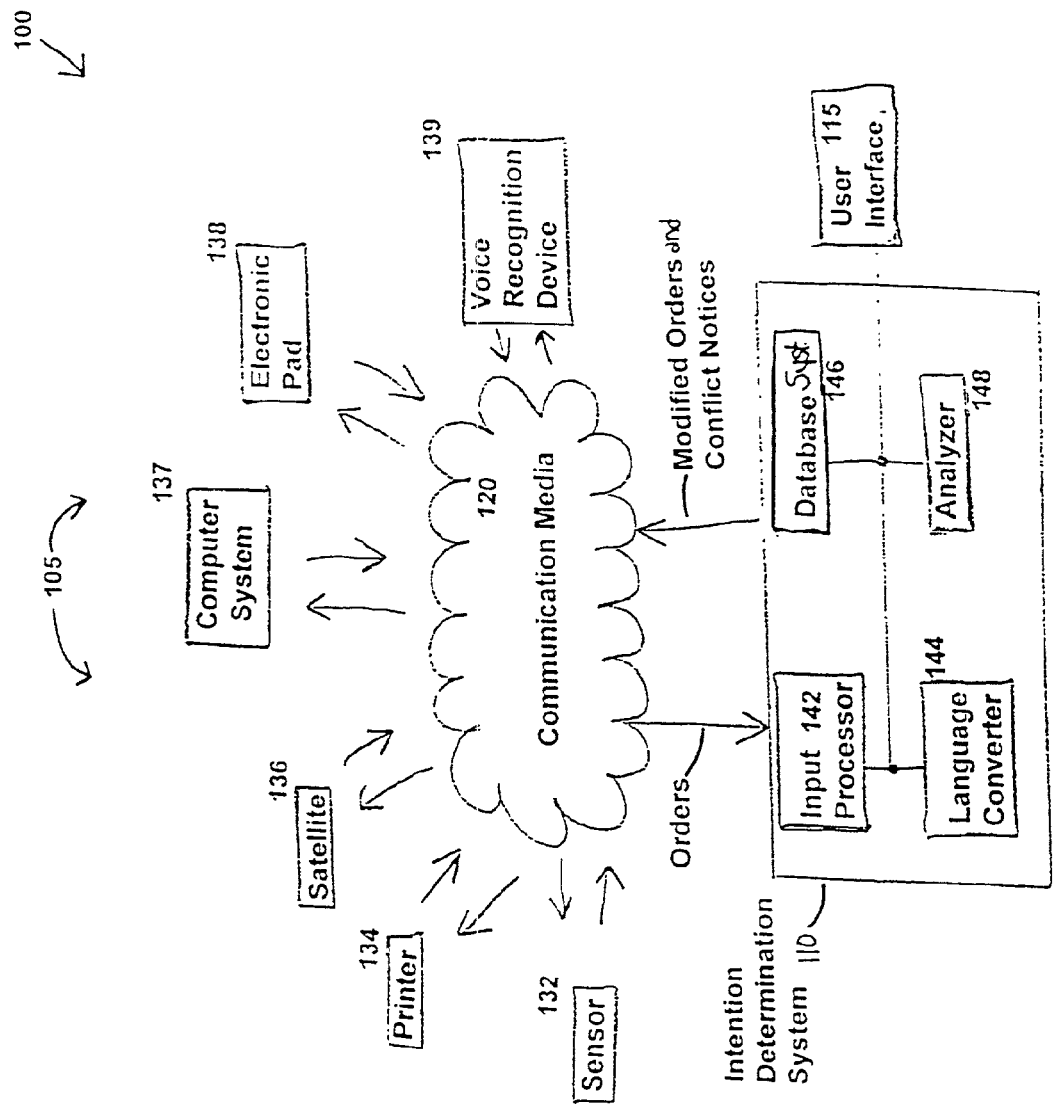
FIG. 1 is a functional block diagram of an intention-based automated conflict prediction and notification system illustrating input/output devices, an intention determination system, and a user interface.

Turning now to the figures, in which like numerals refer to like elements through the several figures, FIG. 1 is a functional block diagram of an intention-based automated conflict prediction and notification system 100 according to an exemplary embodiment of the invention. The system 100 includes input/output devices 105, an intention determination system 110, a user interface 115, and a communication media 120. Using the devices 105, the conflict notification system 100 can either receive information from or transmit information to one or more remote users. For example, a commander of a division could transmit military orders to the intention determination system 110 using one of the devices 105. Alternatively, a physician could transfer prescribed treatment or a manager could transfer inventory information using the input devices 105.

Because of the widespread applicability of the system 100, the input devices 105 could be any one of several types of devices. The devices 105 could include a sensor 132 such as an optical sensor, infrared sensor, low-level sensor, thermal sensor, magnetic sensor, motion sensor, radar sensor, or a combination thereof, with or without video and/or audio recording capabilities. In some situations, a large number of the sensors would be deployed, while in other situations only one or just a few sensors would suffice. For example, in a military situation, a large number of different types of these sensors could be air-dropped into a battle zone to acquire relative information regarding the field, such as movement of enemy troops, artillery, armor, and other equipment, physical characteristics of the local terrain, and local weather conditions. Similarly, in a medical application this sensor could detect patient movement and in a management application this sensor could detect employee, vehicle, or product movement. As indicated by the arrows, information can be both transferred to the sensor 132 or received from the sensor 132. For example, the system 100 could request that the sensitivity of the sensor 132 be increased. This information could then be transferred to the sensor 132.

Also, the devices 105 could include a printer 134 designed to periodically print relevant information. By using the printer 134, the system 100 could confirm that a "hard copy" of critical information remains available in the event of a power outage. The input/output devices 105 could also include a satellite 136 that gathers weather or position-related information. Additionally, a computer system 137 could also receive and transfer information to the system 100. Within the computer 137 a text editor, such as Microsoft® Word®, Corel® WordPerfect®, or the like could function as the input device. Furthermore, the input/output devices 105 could include an electronic pad 138, such as the IBM® Crosspad® that enables digital capturing and transferring of handwritten information. The electronic pad 138 could also be a modified personal digital assistant, such as a PALM® organizer manufactured by 3COM®. In addition, the input/output devices 105 could include a voice recognition device 138, such as a cellular phone or a radio transmitter. Depending on the particular circumstances, all of these input/output devices can be deployed, only a portion of them can be used, or additional devices can supplement or replace those described above.

The input/output devices 105 could transfer information to the intention determination system 110 using the communication media 120. The communication media could be a wireless digital network, an Ethernet, an optical network, a radio network, or some other suitable communication media. As would be appreciated by one skilled in the art, the type of communication media may vary depending on the type of input/output device. A suitable communication media is described in detail in U.S. Provisional Patent Application Ser. No. 60/223,813 filed on Aug. 8, 2000, which is hereby incorporated by reference in its entirety.

The intention determination system 110 receives information, such as instructions or orders, across the communication media 120. This system pre-validates that orders conform to the issuer's intent and predicts conflicts based on analysis of current military doctrine, terrain, the orders of other units, weather, enemy placements, and other factors that can be modeled in a rules-based environment. As previously mentioned, a similar application can be made for a medical implementation or management implementation of this intention determination system 110.

The intention determination system 110 may include an input processor 142, language converter 144, database management system 146, and analyzer 148. Each of these components, including the user interface 115, can function as independent applications and can execute on distinct computers, as a multi-tiered architecture, or on a single machine. Consequently, additional modules can be developed as self-contained components. The modular nature of this intention determination system allows selective choosing of the system configuration. For example, running the intention determination system 110 at a battalion level may warrant use on a single computer, while running this same system at a division level may warrant using multiple servers. Of course, additional modules and/or variations of the above modules can be included in the system.

Figure 2:
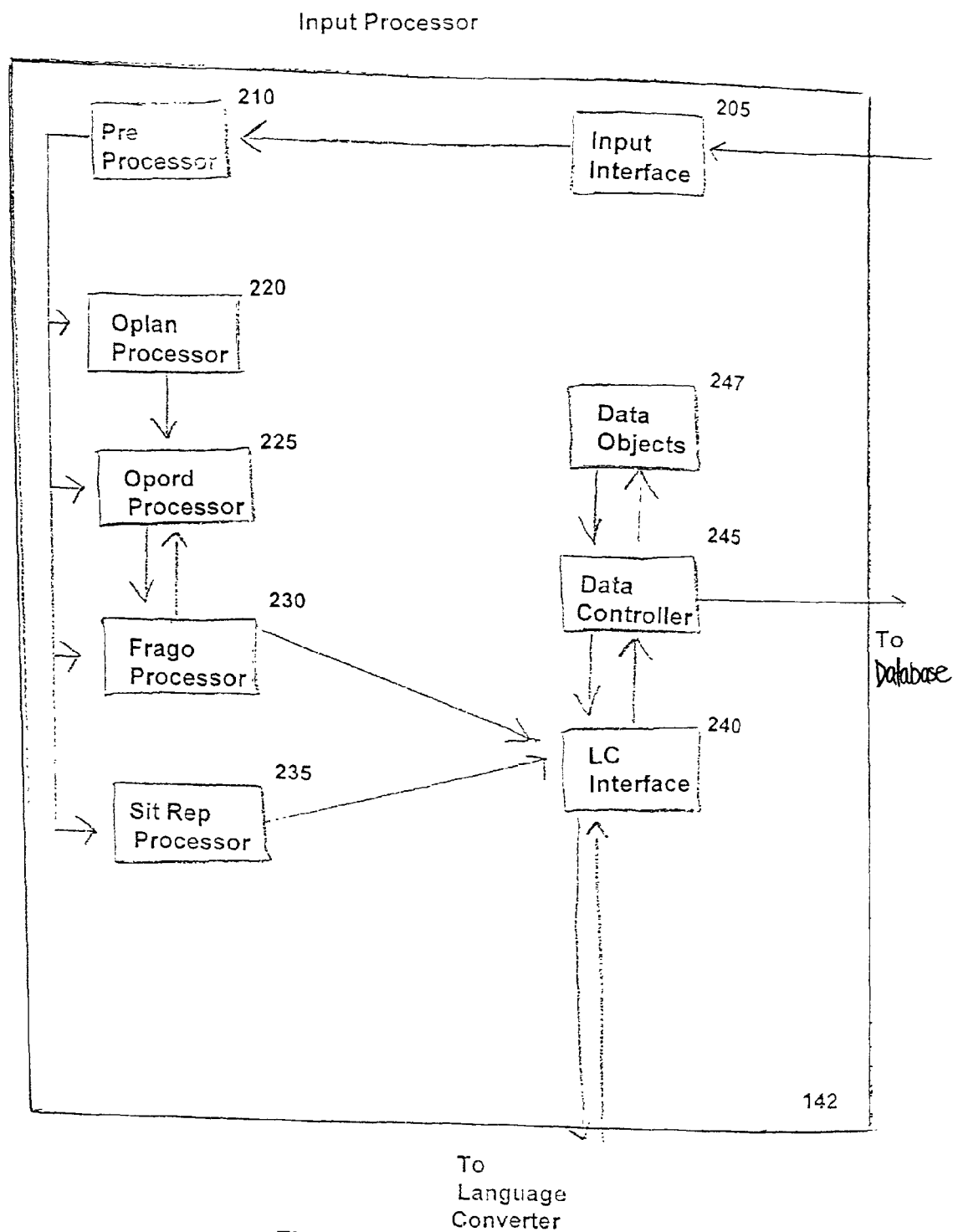
FIG. 2 is a functional block diagram of the input processor of FIG. 1 illustrating major components within the input processor.

The input processor 142 receives information such as text messages (orders, field status reports, and so forth) and sensor data from the input/output devices 105. As more clearly seen in FIG. 2, the input processor 142 includes an input interface 205, preprocessor 210, OPLAN processor 220, OPORD processor 225, FRAGO processor 230, and SITREP processor 235. This input processor accepts and processes communications to determine their relevance. Subsequently, the input processor passes these communications to the language converter 144.

The input interface 205 passes the received communication to the preprocessor 210. This preprocessor parses communications to determine the type of report that was entered by using data types inherent to the selected programming language. Through initial parsing, the preprocessor 210 can determine which connected processor should receive the communication. For example, the preprocessor 210 could indicate that a situational report was received and should be transferred to the SITREP processor 235. Similarly, this preprocessor transfers an operational plan (OPLAN) to the OPLAN processor, an operation order (OPORD) to the OPORD processor 225, and a fragmentary order to the FRAGO processor 230.

The function of the processors within the input processor 142 varies depending on the type of implementation. For the military implementation shown in FIG. 2, the OPLAN Processor 220 confirms that the OPIAN is approved and passes it to the OPORD Processor 225. For example, the OPLAN processor 220 may receive from the preprocessor 220 communication that says "$24^{th}$ Infantry Division (mechanized) conducts corps main attack in zone to block Euphrates River Valley; continues attack to east to destroy enemy forces." When this OPLAN is approved, the OPLAN processor 220 passes this OPLAN to the OPORD processor 225.

The OPORD Processor 225 then cycles through the OPORD pulling out fragmentary orders, or FRAGO sentences, at each cycle. For example the FRAGO sentences could be "Report to base camp to replenish ammo," "Patrol NW of base camp (OBJ CORN), or some other suitable fragmentary order. The OPORD processor 225 passes each FRAGO to the FRAGO processor 230 along with information that includes the paragraph of the OPORD and unit information. The FRAGO processor identifies the relationship between the FRAGO and OPORD. For example, the FRAGO processor 230 could identify that this FRAGO should be the first FRAGO that gets executed to accomplish the OPORD.

Like the FRAGO processor 230, the SITREP processor 235 processes information, such as sensor data, instructions, or other messages, that provides situational reports. For example, one of the sensors 132 could transmit a report (in the form of a text message, activation signal, or other report) regarding enemy movement. After the preprocessor 210 receives this report, this preprocessor passes the report to the SITREP processor 235, which identifies the type of situational report. As can be appreciated by one skilled in the art, the processors 220 - 225 can vary if the input processor 142 is used in another implementation, such as a medical or management implementation.

When the data emerges from the FRAGO processor 230 or the SITREP processor 235, it enters the language converter (LC) interface 240. The LC interface 240 transfers information between the language converter 144 and a data controller 245. The data controller 245 stores, using the data objects 247, information relevant to the operation of the input processor 142. In addition, the data controller notifies the database 146 and the analyzer 148 of changes that were made by the input processor 142.

In addition to the input processor, the intention determination system 144 also includes the language converter 144. The language converter 144 converts the English (or other language) text received from the input processor 142 to symbolic representations of ideas that may contain spatial or temporal concepts. These symbolic representations may be referred to as restructured messages, or spatial-temporal strings.

Figure 3:
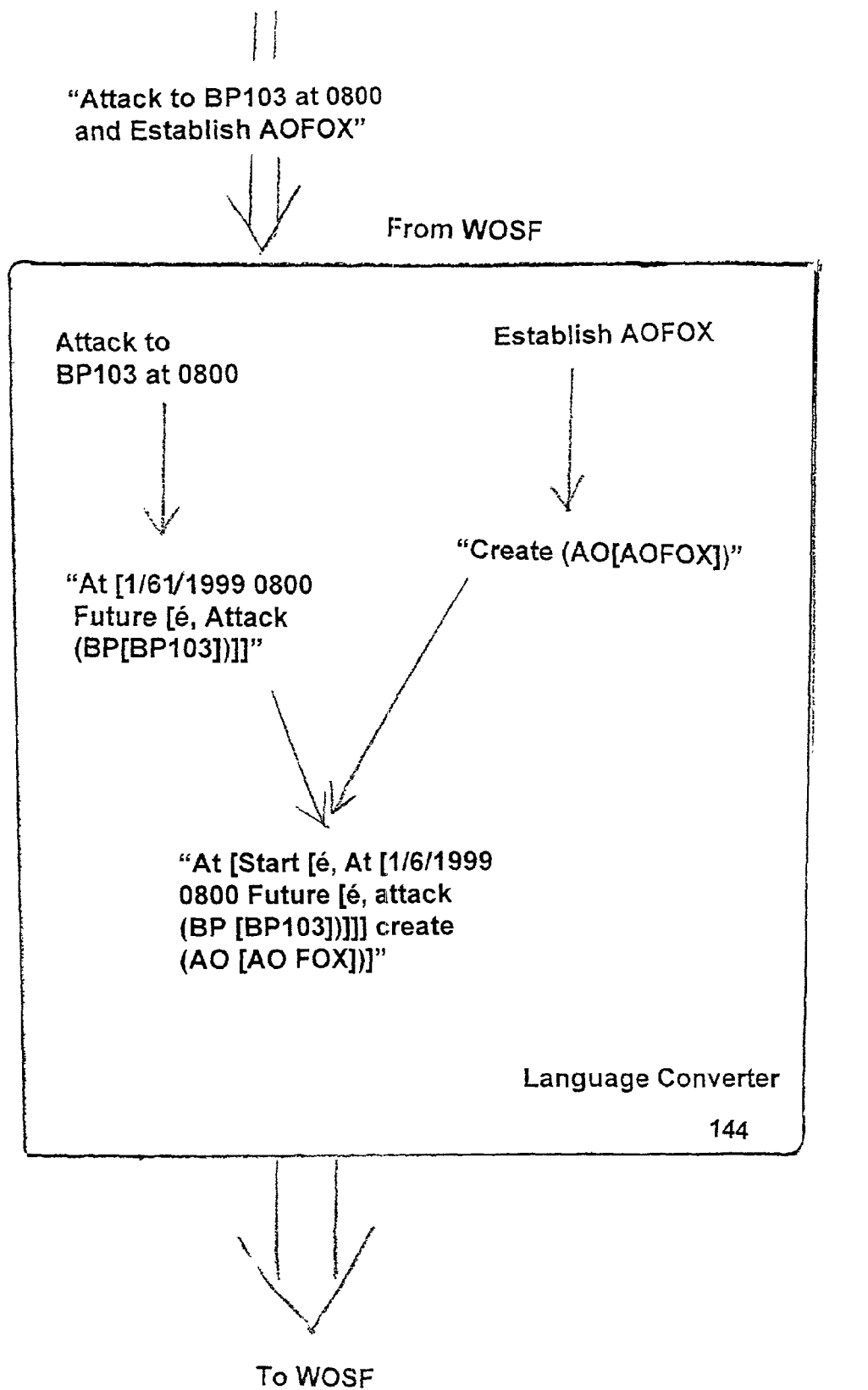
FIG. 3 is a functional block diagram of the language converter of FIG. 1 illustrating the processing of a fragmentary order as it goes through the language converter.

FIG. 3 illustrates the processing of a fragmentary order as it goes through the language converter 144. The fragmentary order that leaves the input processor 142 reads "Attack to BP103 at 0800 and establish AO FOX." The language converter 144 separates this message into two the sequential actions "Attack to BP103 at 0800" and "Establish AO FOX." Converting "Attack to BP103 at 0800" to spatial temporal format produces "At [1/6/1999 0800 Future [é attack (BP [BP103])]]." The é operator indicates that an event, which is an attack, follows. The attack is on BP 103, represented by the spatial operator BP and will take place in the future at 1/6/1999 at 0800. One skilled in the art will appreciate that the language converter 144 includes a defined vocabulary, such as verbs, adverbs, and adjectives that enables conversion of natural language statements to a spatial-temporal format.

Similarly, converting "Establish AO FOX" to spatial temporal format produces "create (AO[AO FOX])". This indicates that an area of operations (AO) will be created that is named AO FOX. Combining the statements produces "At [Start [é, At [1/6/1999 0800 Future [é, attack (BP [BP103])]]] create (AO [AO FOX])]." The structure of this statement enables efficient reading to mean that an attack will take place on 1/6/1999 at 0800 on battle position BP 103, which will create the area of operations AO FOX. Hence the natural languages message "Attack to BP103 at 0800" was converted into easily processed machine language that aides in effective processing of the statement.

In an alternative embodiment for parallel processing of decomposed statements, the language converter 144 can include a pre-processor and a post-processor. The pre-processor will send each successive paragraph to independent machines/CPUs and the post-processor will recombine these sequential strings afterwards. Performance testing can determine if the language converter 144 should function linearly or in parallel.

Once the instructions or other data are converted to a restructured message by the language converter 144, the language converter 144 sends the message back to the data controller 245 in the input processor 142. The data controller 245 forwards the restructured message to the database 146 and updates the analyzer 148 accordingly. Before forwarding the restructured message, the language converter 144 can assess if the received message was a query, an order, or a report or other message. For example, a user could ask "When is BSD24 attacking BP103?" The language converter would interpret this statement as a question instead of report information that should be stored in the database.

Figure 4:
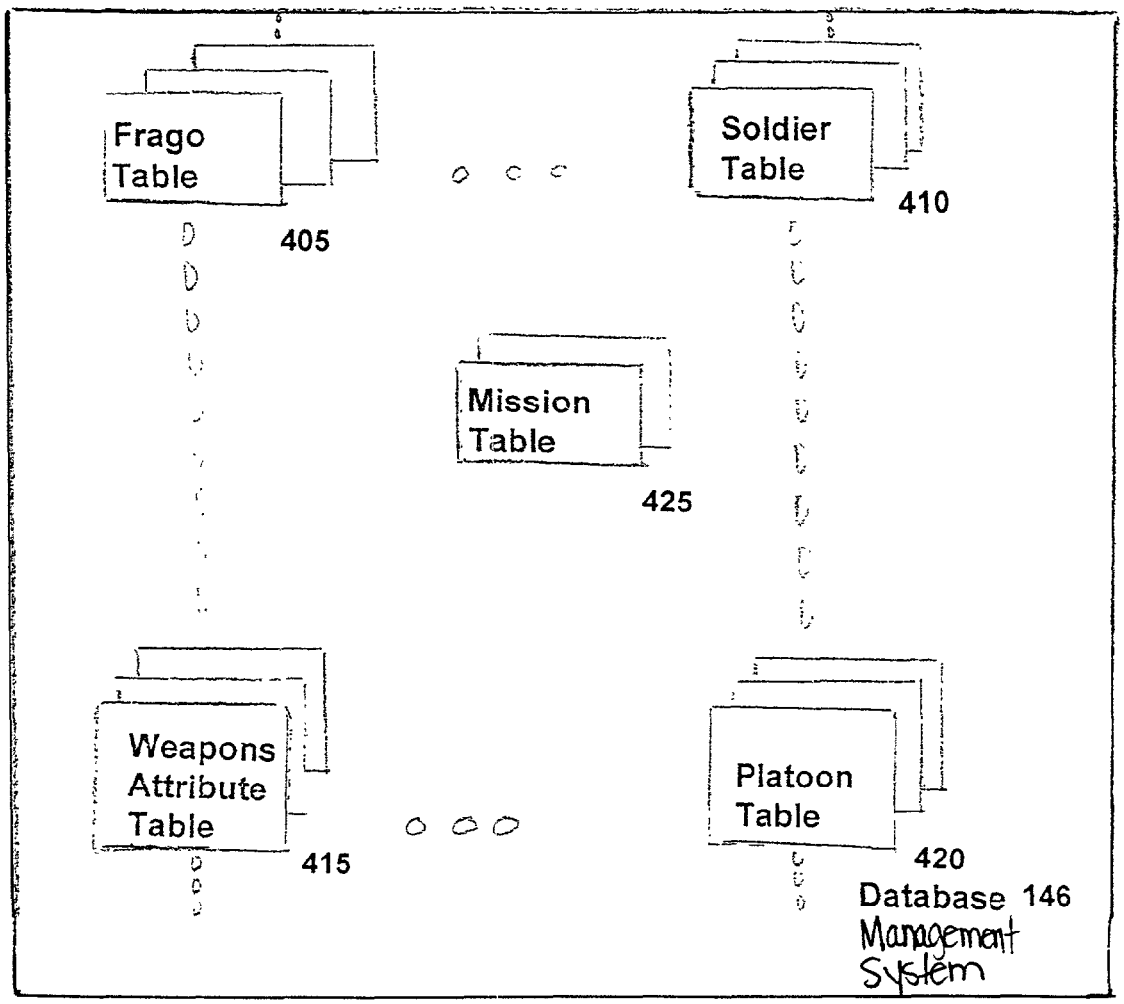
FIG. 4 is a functional block diagram of the database of FIG. 1 illustrating sample tables within the database management system.

Turning now to FIG. 4, there is illustrated a functional block diagram of the database management system 146 of FIG. 1 showing sample tables, or data storage locations, within the database system. The database system 146 is a standard database with spatial and temporal engine enhancements. This module may be composed of several databases including, but not limited to, a unit capabilities database, an OPORD database that also tracks FRAGOs, a SITREP database, a terrain database, an equipment database, and a military doctrine database. Alternatively, medical databases could be included in a medical implementation of the system 100 and inventory, schedule, or vehicle location databases could be included in a management implementation.

The database management system 146 stores all spatial and temporal information relevant to the intention determination system 110. Some sample tables include a FRAGO table 405, soldier table 410, weapons attribute table 415, platoon table 420, and mission table 425. The FRAGO table 405, for example, could store all of the fragmentary orders received for a given OPLAN. In contrast, the weapons attribute table 415 could list the attributes of all of the weapons assigned to soldiers in a given division, for example. Other tables could include an ammunition table, weather condition table, and dependency tables that indicate contact individuals. As mentioned above, "table" as used herein means any data storage location (whether tabular or not).

Because the database management system 146 includes temporal enhancements, it time-stamps and keeps a permanent record of received data, which enables retrieval of data regardless of when it was stored. Moreover, the temporal nature of the database management system 146 supports recognition of time periods apart from discrete points in time. This database management system is also self-indexing and self15 assembling, which enables maintenance of the data in an organized manner with minimal human effort.

Figure 5:
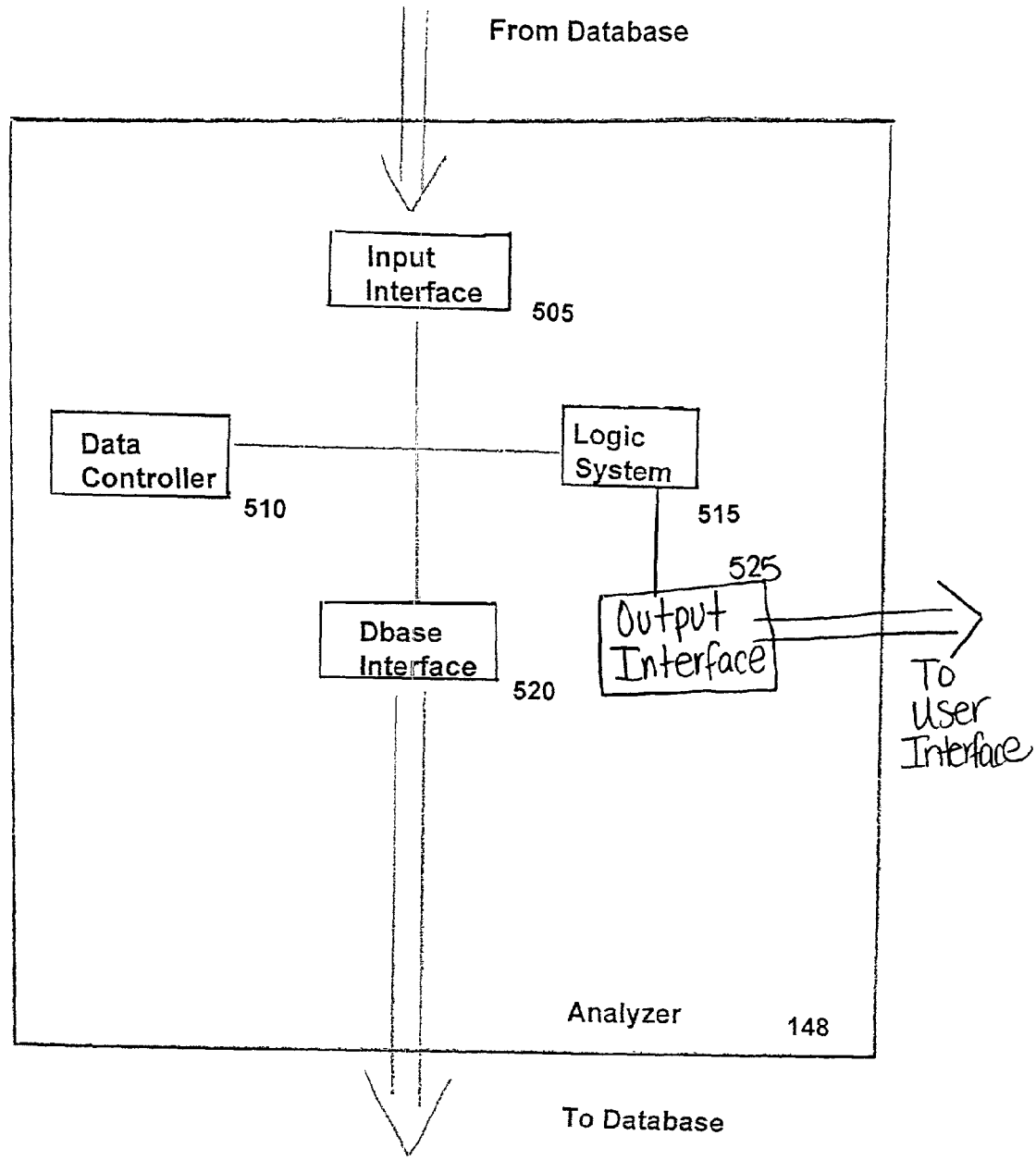
FIG. 5 is a functional block diagram of the analyzer of FIG. 1 illustrating some of the major components of the analyzer.

Turning now to FIG. 5, there is illustrated a functional block diagram of the analyzer 148. The 148 identifies conflicts and subtle interdependencies by processing the restructured messages that emerge from the language converter 144. The analyzer 148 uses a modular rule-based analysis system in testing the restructured messages and associated information. This analyzer 148 assesses current and future situations for conflicting orders. A military example of a conflicting order could be the issuance of a command to send a unit over impassable terrain. The analyzer 148 could flag this order as problematic in advance by comparing the unit's planned route with known geographic data. Data feeds from satellite will likewise enable suggestions of the safest route. Hence, the analyzer 148 provides predictive conflict assessment for both present and future situations. In addition, the analyzer 148 completes validity checks on the data it receives. For example, the analyzer 148 will check an area table within the database management system 148 to confirm that an area specified in a received fragmentary order actually exists.

Generally, the analyzer 148 includes an input interface 505 that receives natural language messages and spatial temporal messages, as well as associated information such as weather conditions from the database management system 146. Generally, the input interface 505 processes the information received from the database and identifies, based on the data type, whether it should be sent to a data controller 510 or a logic system 515. Typically the data controller 510 receives information not previously processed. Hence, it initializes this data and sets up appropriate relationships. Moreover, the data controller 510 holds and tracks all the information relevant to the analyzer 148. This data is stored in a set of data objects, not shown, that are controlled and manipulated by the data controller. When the data controller 510 receives new data objects, it notifies the database interface 520 and the logic system 515 of the new information.

The logic system 515 uses a set of predefined rules, such as military doctrine, to determine if the attributes of any of these data messages violate any rules. For example when an instruction is received to initiate an attack, the logic system determines whether the commander has followed the proper military procedures based on the predefined rules. The database interface 520 communicates with and constantly scans the database management system 146 for new information from other systems and passes this new information in the form of objects to the data controller 510. The analyzer 148 also includes an output interface 525 programmed to transfer information between the intention determination system 110 and the user interface 115. For example, the output interface 525 could transfer an alert to the user interface 115 that predicts a conflict.

Figure 6A:
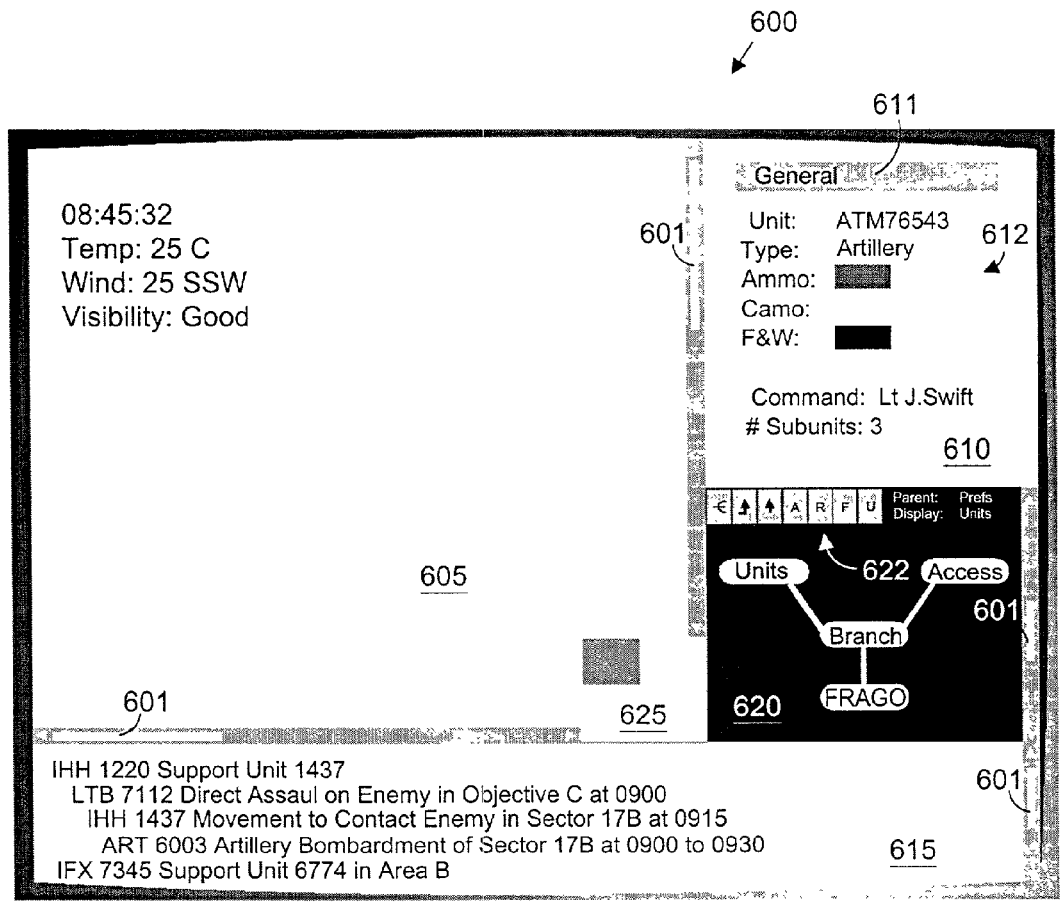
FIG. 6A is a Windows-based screen generated by the user interface of FIG. 1 illustrating the condition of the battlefield using a multi-panel format.

In addition to the intention determination system 110, the automated system 100 includes the user interface 115. FIG. 6A is a Windows-based screen 600 generated by the user interface 115 illustrating the condition of the battlefield using a multi-panel format. Within the screen 600, multiple panels present a description of the current battlefield situation and communicate any changes or conflicts received from the analyzer 148. For any one of these panels, using a color scheme such as red (alert), green (safe), yellow (caution), blue (reference information), and black (environment) can highlight the relative importance or function of the displayed information. Scroll bars 601 enable viewing additional portions of a panel. As would be appreciated by one skilled in the art, the content of the multi-panel varies as the implementation varies. For example, using the user interface 115 in a medical implementation could result in the display a patient's vital signs in one of the panels.

The screen 600 includes a display panel 605 that graphically presents the units, areas, terrain, and relationships. By placing objects on a terrain map, real-world locations can be easily identified. For example, the display panel can include representative icons. In addition, using color can enable quick observation of some unit types, area types, or relationship types. For example, caution areas could be red and friendly to enemy relationships could be red lines. The display panel 605 could also include overlays that identify time, temperature, wind, or visibility. In addition, specifics regarding the terrain can also be indicated with the use of overlays. To display conflicts in the display panel 605 for a unit, the user interface 115 may cause the representative icon to begin flashing.

The screen 600 also includes an inspector panel 610 that provides specific information on objects that appear in the display panel 605 and the message panel 615. The inspector panel 610 may be composed of a pop-up menu 611 and a display area 612. The pop-up menu 611 is used to select a topic area that the user wishes to get the details of for a selected object. Typically, objects will include a general pop-up menu that displays general information about the object. However, portions of the contents of the pop-up menu 611 are dynamic and determined by the object, area, or message selected. For example, only units that can transport cargo will include a "cargo" pop-up menu.

In addition to the inspector panel 610, the screen 600 includes a dynamic message panel 615. This message panel displays fragmentary orders and situational reports as processed by the intention determination system 110. As the analyzer 148 assesses validity and conflict issues regarding the messages received, the message panel 615 displays these messages. In one embodiment, new items are added to the bottom of the list enabling a user to scroll through all the received messages.

Including a preferences panel 620 in the screen 600 enables the user to set display preferences for objects that appear in the display panel 605 and the message panel 615. The preferences panel 620 uses a spherical node-based navigation system particularly suitable for dynamic applications. A portion of the preferences panel 620 includes four navigational nodes representing preferences, areas of operation, units, and fragmentary orders. Selection of one of these nodes positions that node in the center as described later with reference to FIG. 6C. Of course, the node-based navigation system can be provided with another number of nodes and/or with the nodes representing other things such as medication type, medication dosage, pre-existing conditions, and patient history in medical applications, and inventory, production scheduling, employee availability, and vehicle location in a management system applications.

In addition to navigational nodes, the preferences panel 620 includes navigational buttons 622 for quickly jumping between areas. The branch mode and spherical mode navigation button allows switching between spherical navigation and linear navigation. Other buttons could include an areas (A) button that allow quick navigation to the areas node of the preferences tree. Similarly, a relationship button (R), fragmentary order button (F), and units button (U) enable efficient navigation to their respective portions of the preferences tree. The preferences panel 620 also includes navigational clues that provide a quick-reference for users. For example, the preferences panel 620 lists the immediate parent of the current node next to the label Parent and lists the main branch of the preferences under display.

Figure 6B:
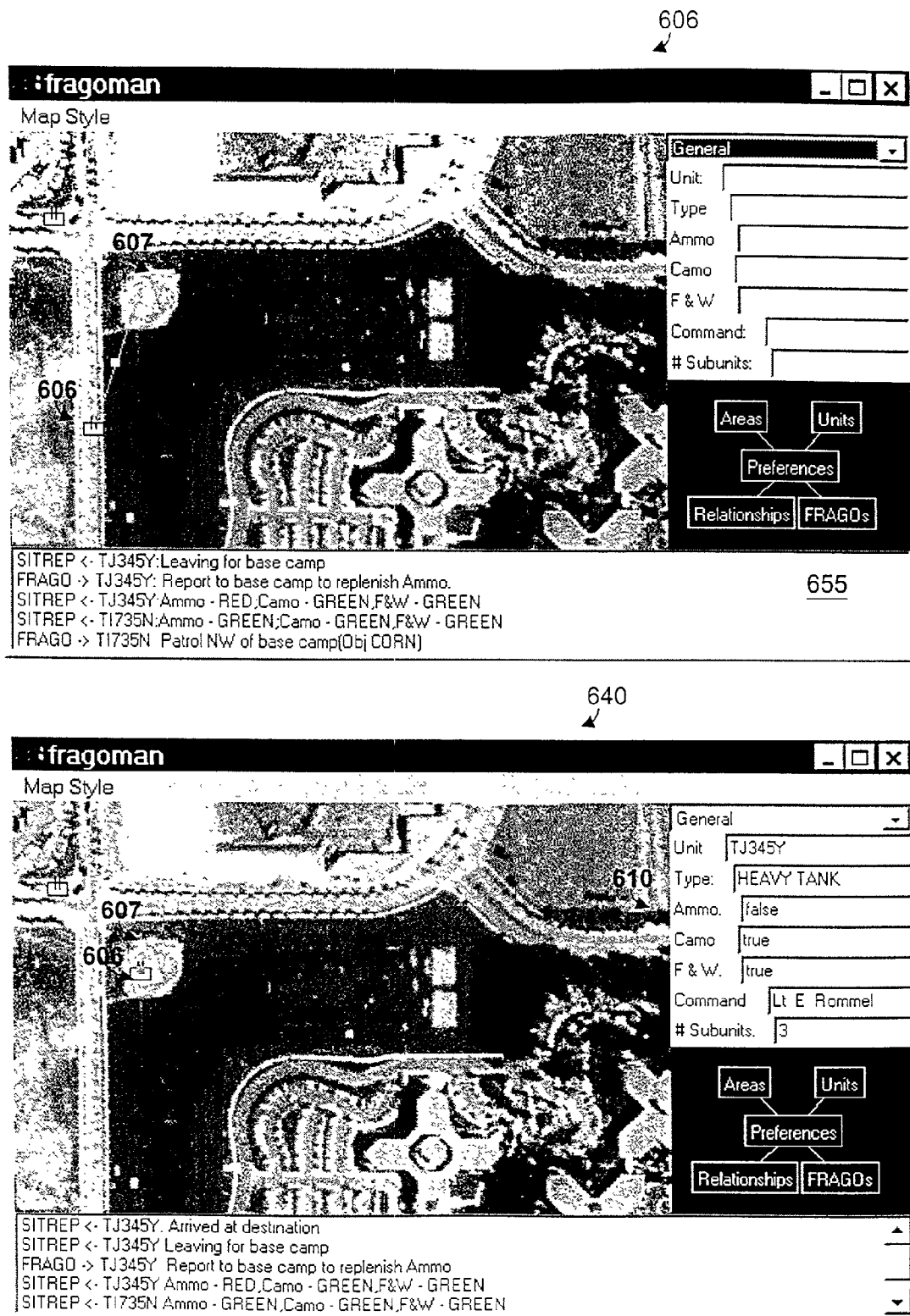
FIG. 6B illustrates two Windows-based screens generated by the user interface of FIG. 1 illustrating the condition of the battlefield for a simulated mission at subsequent time intervals.

Turning now to FIG. 6B, it depicts two Windows®-based screens generated by the user interface 115 illustrating the condition of the battlefield for a simulated mission at subsequent time intervals. Within the display panel 605 of the screen 630, object 606 moves toward destination 607. To better assess why the object 606 is moving toward the destination, a user can review previously issued orders in the message panel 615. One fragmentary order (FRAGO) indicates that unit TJ345Y should report to the base camp to replenish the ammunition supply. Subsequently, screen 640 indicates that the object 606 has reached the destination 607. Selecting the object produces additional specifics in the inspector panel 610. Consequently, a user can identify that object 606 is a tank with three subunits under the command of Lieutenant E. Rommel.

Figure 6C:
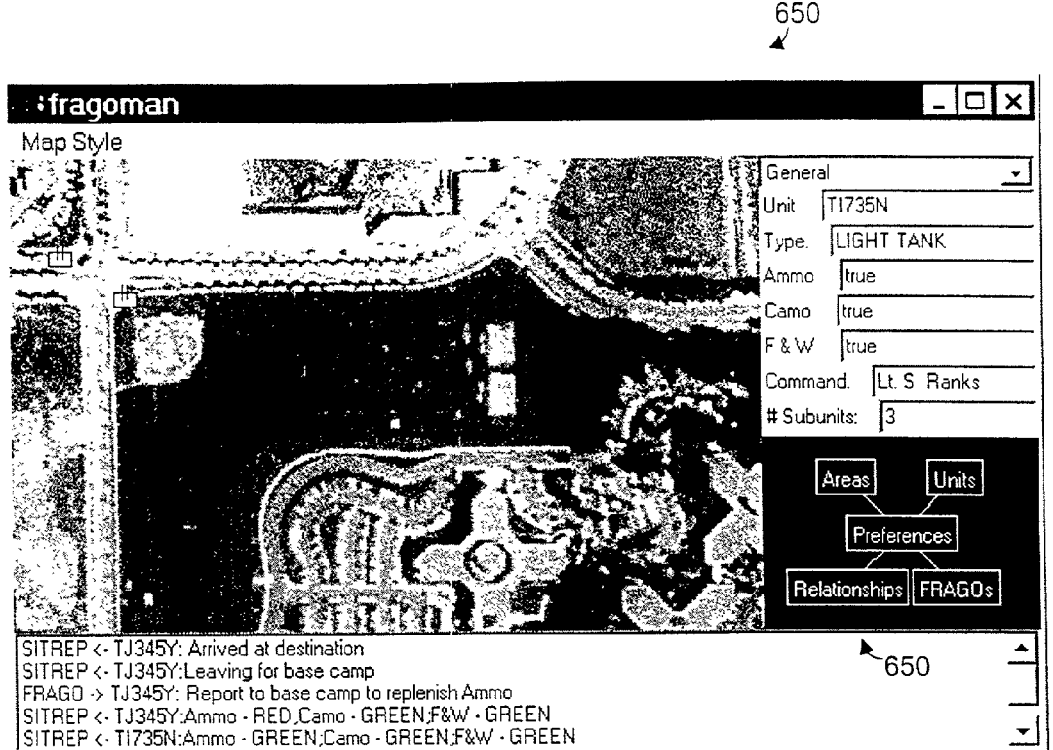
FIG. 6C depicts two Windows-based screens generated by the user interface of FIG. 1 illustrating the node based navigational nature of the user interface for a simulated mission.
Figure 6C:
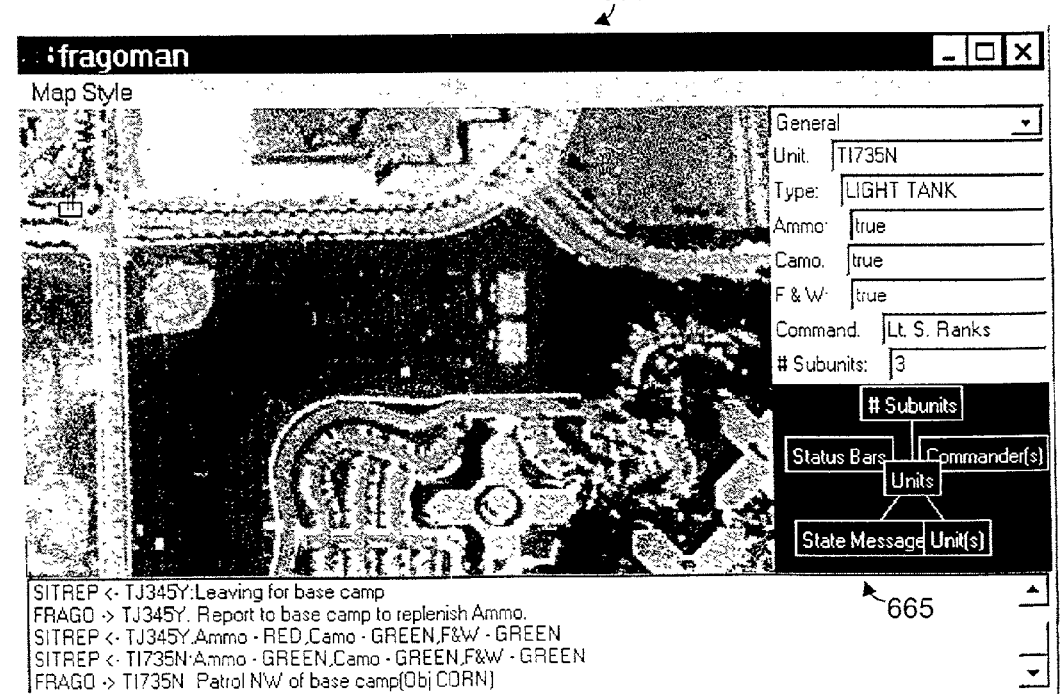

FIG. 6C depicts two Windows-based screens generated by the user interface 115 illustrating the node based navigational nature of the user interface for a simulated mission. The screen 650 includes a preferences panel 655 with navigational nodes labeled "Areas," "Units," "FRAGOs," and "Relationships." In screen 660, the preferences panel 665 differs from the panel 655 because a user selected the units navigational node. Consequently, a user can select from any one of the new navigational nodes "Status Bars," "# Subunits," "Commander(s)," "Unit(s)," and "State Message." In addition, selecting the units node twice returns the user to the portion of the preference tree displayed in preferences panel 655. Using spherical navigational nodes, users can efficiently navigate to a desired area without becoming disconnected from a previous area.

Finally, the screen 600 includes a zoom display panel 625. This panel enables omni-directional pan and zoom. With this tool, users can focus on their geographical area of interest on the background map.

Figure 7:
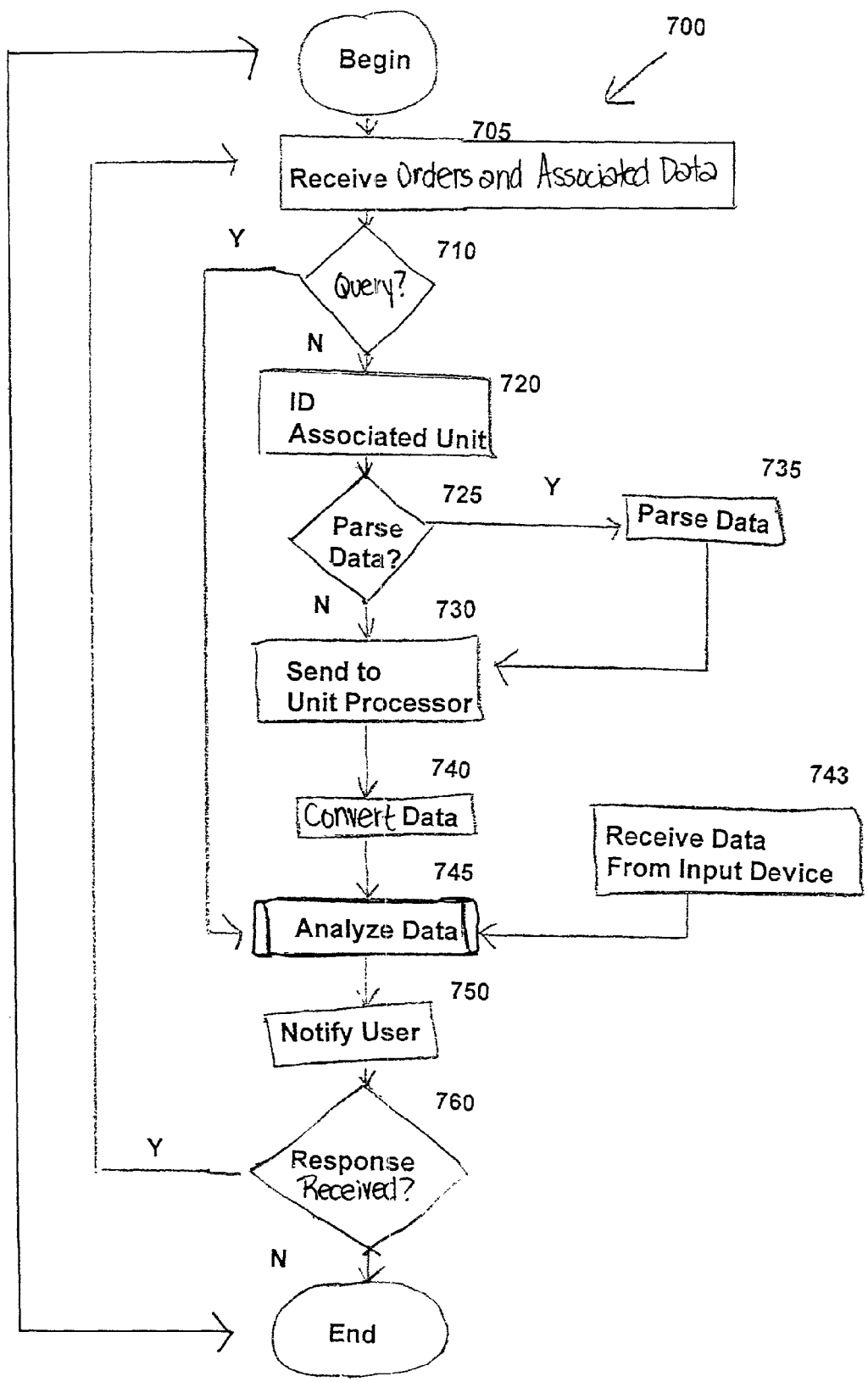
FIG. 7 is a logic flow diagram for a method of automatically notifying a user of potential conflict that may exist among issued instructions.

FIG. 7 is a logic flow diagram illustrating the operation of the automated conflict notification and prediction routine 100. In step 705, the automated conflict notification and prediction routine 700 receives stored orders and associated data. As previously mentioned, the routine 700 and receive the data using any one of several types of communication media, including a broadband wireless digital network. Step 705 is followed by step 710, in which the automated conflict notification and prediction routine 700 determines if the received data was a query, such as "What is over this hill?". Otherwise, the "YES" branch is followed is followed to the routine 745. If the data was not a query (e.g., a situational report of enemy troop location or an attack order), the "NO" branch is followed from step 710 to step 720. In step 720, the conflict notification and prediction routine 700 the type of data it received. In a military implementation, the data could be an operation plan for situational report, for example.

Step 720 is followed by step 725, in which the automated conflict notification and prediction routine 700 determines if the data should be parsed. In making this decision, the routine 700 could consider the type of data received. For example, receiving an operational order warrants parsing while receiving a situational order does not. If the conflict notification and prediction routine 700 parses the data, the "NO" branch is followed from step 725 to step 730. Otherwise, the "YES" branch is followed from step 725 to step 735, in which the data is parsed.

Step 735 and the "NO" branch from step 725 are followed by step 730, in which the data is sent to a processor. Step 730 is followed by step 740, in which the data is converted into a spatial temporal format, or restructured message. These restructured messages can be more effectively processed by the conflict notification and prediction routine 700.

In step 743, the routine 700 receives data from from any one of the input devices 105. Step 740 and step 743 are followed by routine 745, in which both the restructured data and original data are analyzed. Routine 745 is followed by step 750, in which the user is notified. The conflict notification and prediction routine 700 may notify users of potential conflicts. Step 750 is followed by step 760, in which the automated conflict notification and prediction routine 700 determines if the response has been received from the user. If the response has not been received, the "NO" branch is followed from step 760 to "END". Otherwise, the "YES" branch is followed from step 760 to step 705 where the conflict notification and prediction routine 700 receives data. Because the conflict notification and prediction routine 700 controls an evolving or self-learning system 100, the routine 700 is recursive. Hence, the "END" step is followed by the "BEGIN" step, in which the routine 700 repeats in an ongoing manner. Moreover, the distributive nature of the system 100 enables parallel execution of routine 700 by different portions of the system.

Figure 8:
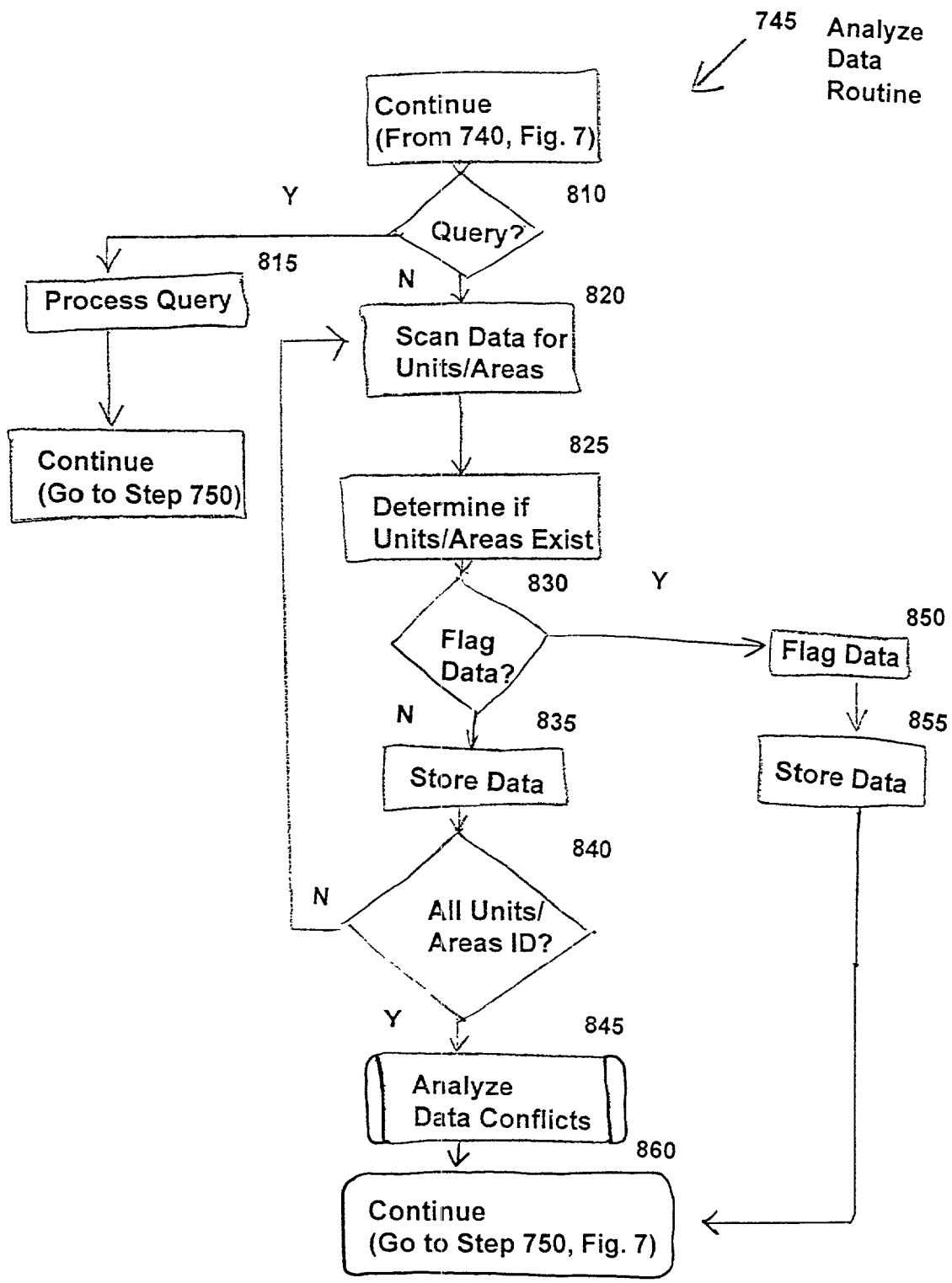
FIG. 8 is a logic flow diagram illustrating the analyze data routine of FIG. 7.

FIG. 8 is a logic flow diagram illustrating the analyze data routine 745. FIG. 8 continues from step 740 in FIG. 7. In step 810, the analyze data routine 745 determines if the received data was a query. If the data was a query, the "YES" branch is followed from 810 to step 815, in which the query is processed. Step 815 is followed by the CONTINUE step 750, in which the analyze data routine 745 returns to step 750.

If the data should not be queried, the "NO" branch is followed from step 810 to step 820, in which units/areas within the received message are identified. Step 820 is followed by step 825, in which the existence of units/areas is determined. For example, the analyze data routine 745 determines if the identified area actually exists. Step 825 is followed by step 830, in which the analyze data routine 745 determines if the data should be flagged. If the data should not be flagged, the "NO" branch is followed from step 830 to step 835, in which the data is stored.

Step 835 is followed by step 840, in which the analyze data routine 745 determines if all units/areas in the received messages has been identified. If the units have been identified, "YES" branch is followed from step 840 to routine 845, in which the data conflicts are analyzed. If the data should have been flagged, the "NO" branch is followed from step 830 to step 850, in which the data is flagged. In step 855, the analyze data routine 745 stores the flag data in data objects, for example. Routine 845 and step 855 are followed by the CONTINUE step 860 which returns to step 750 on FIG. 7.

Figure 9:
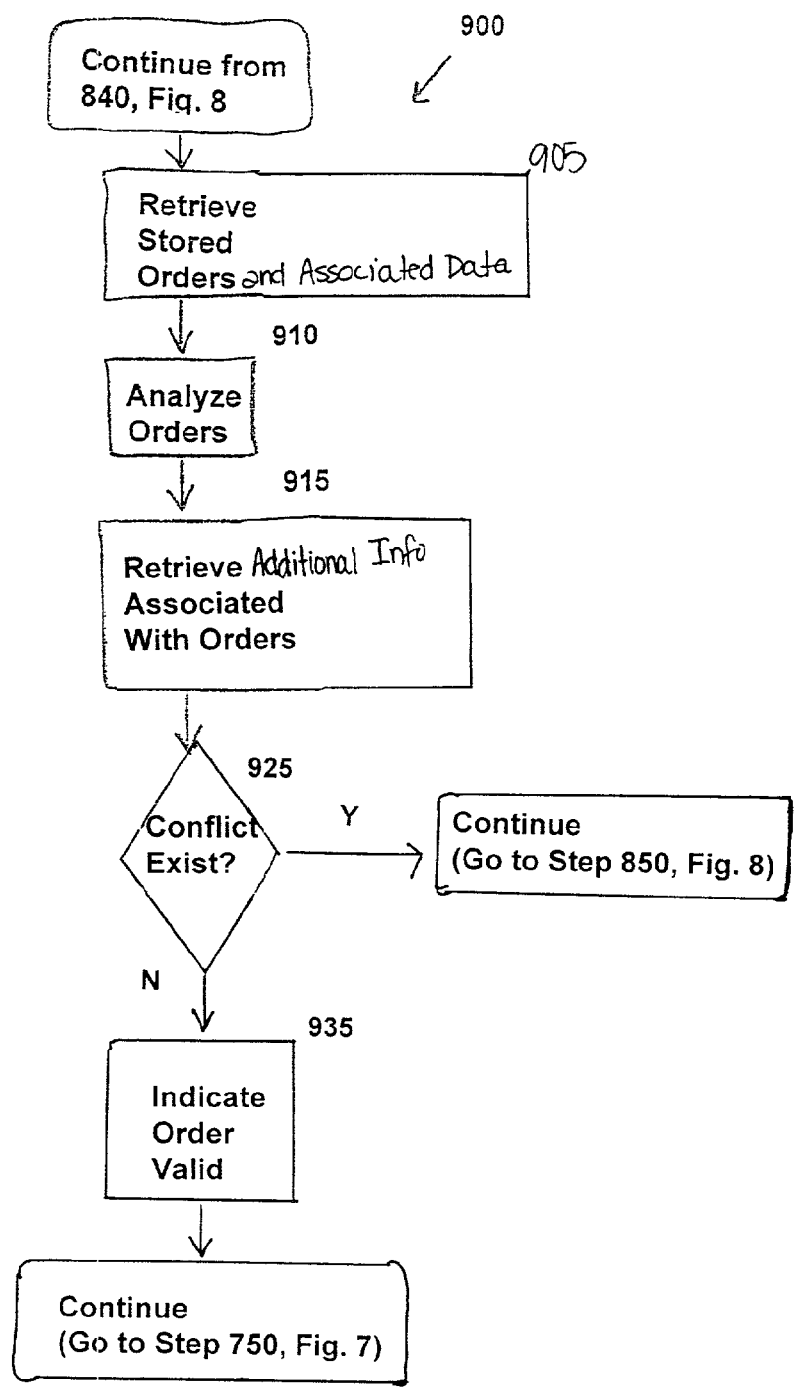
FIG. 9 is a logic flow diagram illustrating the analyze data conflicts routine of FIG. 8.

FIG. 9 is a logic flow diagram illustrating the analyze data conflicts routine 845. In step 905, the analyze data conflict routine 845 retrieves stored orders, such as operational orders, fragmentary orders, and associated data. Step 905 is followed by step 910, in which the orders are analyzed using rule-based methods. Step 910 is followed by step 915, in which additional information associated with the orders is retrieved. For example, weather information or vehicular information could be retrieved because they could affect the execution of the orders.

Step 915 is followed by step 925, in which analyze data conflict routine 845 determines a conflict exists. If a conflict does exist, the "YES" branch is followed from step 925 to the "CONTINUE" step 930, which returns to step 850 shown on FIG. 8. If a conflict does not exist, the "NO" branch is followed from step 925 to step 935 order is indicated as valid. Step 935 is followed by the "CONTINUE" 940, which returns to step 750.

While the present invention has been described above mostly as embodied in an intention-based automated conflict prediction and notification system for military operations, it will be understood that the invention can be alternatively embodied in systems for use in other fields. Such fields include business and personal management, medical treatment, and other areas that include nondeterministic situations with dynamic elements and for which potential conflict identification and resolution would be advantageous. For example, in management applications, the system can be used for scheduling work groups such as salespersons or work crews, for coordinating the position and movement of satellites, commercial carriers (such as aircraft, trucks, and trains), and/or other objects, for planning and scheduling construction, engineering, manufacturing, or similar projects, for inventory control applications for any type of product, or for personal day planner applications. In medical treatment applications, the system can be used for avoiding prescribing medications that should not be taken together, avoiding medical procedures such as certain surgeries, diagnostic procedures, treatment procedures, and so forth that should not be performed on persons taking conflicting medications or with certain conditions, or in other medical applications where conflicts may arise.

It will be understood that the method described above can be carried out in various sequences, and the sequences describe herein are provided as an illustration only and by no means as a limitation. It will be further understood that the terms "a," "an," and "one" as used herein are not intended to mean only "one," but may also mean a plurality, and terms used in the plural form can include the plural form.

In view of the foregoing, it will be appreciated that present invention in an exemplary form provides an automated intention-based predictive support system. It should be understood that the foregoing relates only to the exemplary embodiments of the present invention, and that numerous changes may be made therein without departing from the spirit and scope of the invention as defined by the following claims.

The invention claimed is:

1. An automated system for issuing at least one alert when a natural language message pertaining to a current or a future event potentially conflicts with event information comprising:
- a first set of one or more input devices for receiving the natural language message entered by a user and transmitting the natural language message to an intention determination system;
- a second set of one or more input devices providing the event information to the intent determination system, the event information including a current event known to the system, a future event predicted by the system, or one or more events specified by another natural language message pertaining to a current or future event;
- the intention determination system including an input processor for receiving the natural language message and the event information, wherein the input processor includes a preprocessor for determining a report type for the natural language message and a plurality of processors, each processor for processing messages of a specific report type, wherein the preprocessor determines that the natural language message is of a first report type, that the event information is of a second report type based on the source or content of the event information, transfers the natural language message to a first one of the plurality of processors based on its report type for processing, and transfers the event information to a second one of the plurality of processors based on its report type for processing;
- the intention determination system including a language converter for converting the natural language message and the event information spatial-temporal language stings representing events, the spatial-temporal language stings stored in a database and including an event, a type of event, time of event, duration of event, areas associated with an event, other characteristics of event, environmental condition information, and reference information in the database, wherein the database is enhanced using temporal query language features including, timestamping records of spatial-temporal language string as they are entered in the system, or noting the time during which the event information is valid; and
- the intention determination system including a rule-based analyzer for determining if execution of the natural language message complies with the intent of a user issuing the natural language message prior to issuance of the natural language message for execution based in part on an analysis of the spatial-temporal language strings received from the language converter and a plurality of messages and reference information in the database, and issuing an alert in case of a potential conflict wherein potential conflict is a conclusion that one or more events represented by the spatial-temporal language strings is incapable of being completed.

2. The system of claim 1 wherein the messages include text messages.

3. The system of claim 2 wherein the messages are converted to executable instructions for machine processing.

4. The system of claim 1 wherein the first set of input devices includes devices selected from the group consisting of a PDA, a cellular phone and a radio transmitter.

5. The system of claim 1 wherein the second set of input devices is selected from the group consisting of an electronic pad, a sensor, and a satellite.

6. The system of claim 1 further comprising an output device for generating a record of the alert.

7. The system of claim 1 wherein each of the user interfaces includes a node based navigation system that allows user customization of how the alert is displayed.

8. The system of claim 1 wherein at least one of the messages is issued from a remote location.

9. The system of claim 1 wherein the intention determination system comprises:
- the rule-based analyzer for periodically retrieving and processing spatial-temporal language strings and reference information stored in the database to determine if there is a conclusion that one or more events represented by the spatial-temporal language strings is incapable of being completed.

10. An intention determination system for predictive checking of whether a natural language message pertaining to a current or a future event potentially conflicts with event information comprising:
- an input processor for obtaining the natural language message related to a future event and the event information including a current event known to the system, a future event predicted by the system, or one or more events specified by another natural language message pertaining to a current or future event, wherein the input processor includes a preprocessor for determining a report type for messages received by the intention determination system and a plurality of processors, each processor for processing messages of a specific report type, wherein the preprocessor determines that the event information is of a second report type based on the source or content of the event information and that the natural language message is of a first report type, and transfers the event information to a second one of the plurality of processors based on its report type for processing;
- a language converter for receiving and converting the natural language message and the event information to spatial-temporal language stings representing events, the spatial-temporal language stings stored in a database and including an event, a type of event, and a time of event, duration of event, areas associated with an event, other characteristics of event, environmental condition information, and reference information in the database, wherein the database is enhanced using temporal query language features including, timestamping records of spatial-temporal language string as they are entered in the system, or noting the time during which the event information is valid;
- the database for storing the natural language message, the event information, other natural language messages, spatial-temporal language strings generated from previous natural language messages, and reference information; and
- a rule-based analyzer for periodically retrieving messages from each of the plurality of processors and processing the spatial-temporal language strings in the database, wherein processing includes determining if execution of the one or more spatial-temporal language strings complies with the intent of a user issuing the natural language message based, in part, on an analysis of the spatial-temporal language strings and the spatial-temporal language strings with stored reference information wherein the analyzer generates an alert in case of a potential conflict wherein potential conflict is a conclusion that one or more events represented by the spatial-temporal language strings is incapable of being completed.

11. The system of claim 10 wherein the messages include orders issued by military personnel.

12. The system of claim 10 wherein the input device includes a device selected from the group consisting of a cellular phone, a radio transmitter, an electronic pad, a sensor, and a satellite.

13. The system of claim 10 wherein each of the user interfaces includes a node-based navigation system that allows user customization of how the alert is displayed.

14. The system of claim 10 wherein at least one of the messages is issued from a remote location.

15. The system according to claim 1, further comprising at least one user interface for respectively notifying the-user by displaying the alert.

16. The system according to claim 10, further comprising at least one user interface for respectively notifying, the user by displaying the alert.

17. The system according to claim 1, further comprising the rule-based analyzer for deriving the intent behind any natural language messages based on a plurality of previously received messages describing activities and environmental conditions information, and storing the information derived from the plurality of previously received messages in the database for future use, in the form of spatial-temporal language strings.

18. The system according to claim 1, further comprising the rule-based analyzer for recursive execution of determining if execution of the natural language message complies with the intent of the user issuing the natural language message prior to issuance of the first natural language message for execution.

19. The system according to claim 1, further comprising the rule-based analyzer for determining whether there is an alternative natural language message to achieve the same end result of the first natural language message when there a conclusion that there is a potential conflict.

20. The system according to claim 19, further comprising the rule-based analyzer for generating an alternative natural language message to achieve the same end result of the first natural language message when there a conclusion that there is a potential conflict.

21. The system according to claim 1, further comprising the rule-based analyzer which uses the database information to determine the hierarchical relationships between users issuing natural language messages, and determining whether the execution of the natural language message by a subordinate complies with the intent of the superior issuing the natural language message.

22. The system according to claim 1, further comprising the rule-based analyzer which identifies incomplete or ambiguous messages issued by the user, generates several possible interpretations of the message, and interactively queries the user to correct the message.

23. The system according to claim 1, which allows evolving and self-learning system behavior including as analyzing information about current and predicted situations and getting new information into the database, in the form of spatial-temporal language strings, thereby modifying one or more aspects of the rules it operates by.

24. The system of claim 10 wherein the messages include orders issued by medical personnel.

25. The system of claim 10 wherein the messages include orders issued by business personnel.

* * * * *